United States Patent [19]

Münzmay et al.

[11] Patent Number: 5,770,264
[45] Date of Patent: Jun. 23, 1998

[54] ANIONICALLY MODIFIED POLYURETHANE UREAS HAVING REDUCED TACKINESS FOR THE COATING OF LEATHER

[75] Inventors: Thomas Münzmay, Dormagen; Tillmann Hassel, Köln, both of Germany

[73] Assignee: Bayer Aktiengesellschaft, Leverkusen, Germany

[21] Appl. No.: 711,423

[22] Filed: Sep. 5, 1996

Related U.S. Application Data

[60] Continuation-in-part of Ser. No. 463,601, Jun. 5, 1995, abandoned, which is a division of Ser. No. 96,802, Jul. 23, 1993, abandoned.

[30] Foreign Application Priority Data

Jul. 31, 1992 [DE] Germany ............... 42 25 290.3

[51] Int. Cl.$^6$ ............... B05D 3/00; B05D 3/12; B05D 3/02; C14C 5/00
[52] U.S. Cl. ............ 427/323; 427/372.2; 427/385.5; 427/389; 427/412; 428/423.4; 428/424.3; 8/94.1 R; 8/94.23; 8/94.21; 524/591; 524/839; 524/840
[58] Field of Search ................. 524/591, 839, 524/840; 427/323, 412, 372.2, 385.5, 389; 428/424.3, 423.4; 8/94.1 R, 94.23, 94.21

[56] References Cited

U.S. PATENT DOCUMENTS

| | | | |
|---|---|---|---|
| 3,412,054 | 11/1968 | Milligan et al. | 524/591 |
| 3,997,491 | 12/1976 | Matsuda et al. | 260/29.2 TN |
| 4,092,286 | 5/1978 | Noll et al. | 260/29.2 TN |
| 4,108,814 | 8/1978 | Reiff et al. | 524/840 |
| 4,772,289 | 9/1988 | Anzinger et al. | 8/94.23 |
| 4,895,894 | 1/1990 | Ruetman et al. | 524/840 |

FOREIGN PATENT DOCUMENTS

| | | |
|---|---|---|
| 2035355 | 8/1991 | Canada . |
| 300335 | 1/1989 | European Pat. Off. . |
| 2730514 | 1/1979 | Germany . |
| 81/02894 | 10/1981 | WIPO . |

OTHER PUBLICATIONS

Das Leger, 25, Oct. 1974, 185–190.

*Primary Examiner*—Patrick D. Niland
*Attorney, Agent, or Firm*—Joseph C. Gil; Richard E.L. Henderson

[57] ABSTRACT

This invention relates to a method for coating leather with an anionically modified polyurethane urea prepared by
(1) reacting
  (A) an aromatic diisocyanate,
  (B) a polyether polyol having a number average molecular weight greater than 1500,
  (C) at least one compound containing 1 to 2 isocyanate-reactive groups and at least one ionic group, and
  (D) a polyamine having a number average molecular weight of at least 32,
  wherein the average total functionality of compounds (B), (C), and (D) is 1.85 to 2.2 and the molar ratio between the NCO groups of component (A) and the NCO-reactive groups of components (B), (C), and (D) is greater than 1, thereby forming an intermediate having residual NCO groups, and
(2) mixing the intermediate product with water to form an aqueous dispersion of an anionically modified polyurethane urea having 800 to 1500 mmol of urethane groups and 800 to 1800 mmol of urethane plus urea groups per kilogram of the polyurethane urea.

11 Claims, No Drawings

ANIONICALLY MODIFIED POLYURETHANE UREAS HAVING REDUCED TACKINESS FOR THE COATING OF LEATHER

This application is a continuation-in-part of application Ser. No. 08/463,601 filed Jun. 5, 1995, which is a division of application Ser. No. 08/096,802 filed Jul.23, 1993, both of which are now abandoned.

BACKGROUND OF THE INVENTION

This invention relates to an improved method for finishing leather by coating the leather with anionically modified polyurethane ureas having low urethane and urea group content.

For the practical application of finished leather, it is crucially important that the applied finishes adhere firmly to the substrate because otherwise the required physical fastness values cannot be achieved. Establishing the required adhesion level is particularly problematical for highly oiled and/or phobicized substrates because the oiling and phobicizing agents generally act as release agents for the finishes. Accordingly, it is standard practice to use a special adhesion promoter either as a special coating or in admixture with other base coat binders, particularly in the finishing of leathers of the type in question. Aqueous dispersions of polyether urethanes have been successfully used as adhesion promoters. German Offenlegungsschriften 2,551,094 (believed to correspond to U.S. Pat. No. 4,092,286) and 2,730,514 and European Patent Applications 255,013 (believed to correspond to U.S. Pat. No. 4,772,289) and 441,196 (believed to correspond to Canadian Patent 2,035,355).

Known polyether urethanes, particularly flexible types, have a certain tackiness. On the one hand, this tackiness is desirable because it improves adhesion but, on the other hand, tackiness is disadvantageous in terms of processing because it adversely affects the stackability of the leathers thus coated. However, flexible formulations are absolutely essential for use as an adhesion promoter because rigid products in the adhesion promoter adversely affect the physical properties, appearance, and comfort of the finished leathers. The use of external plasticizers (European Patent Application 255,013, which is believed to correspond to German Offenlegungsschrift 3,625,442 and U.S. Pat. No. 4,772,289) is undesirable because migration effects cannot be ruled out.

German Offenlegungsschrift 4,003,442 (believed to correspond to European Patent Application 441,196 and Canadian Patent 2,035,355) describes polyether urethane ureas in which the desired flexibility is achieved by using an NCO: (OH+NH) molar ratio of 0.9 to 1 in the production process. Not only the molecular weight and hardness but also the strength of these products is limited. However, the decreased hardness obtained by this method is disadvantageous because the strength of the polymer is reduced and its tackiness is increased. However, optimum fastness values can be obtained only with polymers of increased strength. See *Das Leder*, 25, 185–190 (1974).

U.S. Pat. No. 4,895,894 discloses aliphatic polyether urethane ureas having low urethane and urea group contents. The disclosed products, which are branched or crosslinked, have high moduli but also have excessively high hardness (as in the examples by Shore A values of at least 58). Crosslinked polyurethanes cannot be transferred into the organic phase and thus their degree of penetration when used as base coat binders for leather cannot be regulated in the customary manner by the addition of organic co-solvents.

U.S. Pat. No. 3,997,491 discloses aqueous emulsions of anionic polyurethane resins that can be used to coat leathers. The resins are prepared by a sequence of reactions in which an isocyanate-terminated prepolymer reacts with excess polyalkylene polyamine to form an amine-terminated intermediate, part of the amino groups of this intermediate react with an alkyl isocyanate or an alpha-olefin epoxide to form a second intermediate, and the residual amino groups contained in the second intermediate react with a cyclic dicarboxylic acid anhydride (which produces corresponding carboxy-capped amides). Even before dispersion in water, such compounds do not contain residual isocyanate groups.

Optimum polyurethane ureas for use according to the invention have relatively high strength combined with a low degree of hardness and minimum tackiness and produce very good adhesion to oiled and/or phobicized leathers. Polyurethane ureas which, despite good adhesion, are flexible and tack-free but still show high strength, are desirable for treatment of leathers. Although one skilled in the art might normally expect low urethane and/or urea group content to give flexible products, they also give rise to an increase in tackiness and to a reduction in strength at the same time. This applies particularly when using aromatic diisocyanates.

It has now surprisingly been found that oiled and/or phobicized leathers can be coated with polyurethane ureas having a low content of urethane and urea groups. The polyurethane ureas used in the present invention provide an extremely favorable combination of very high wet adhesion, high flexibility, and low tackiness.

SUMMARY OF THE INVENTION

Accordingly, the present invention relates to a method for finishing leather comprising coating leather with an anionically modified polyurethane urea prepared by (1) reacting
 (A) an aromatic diisocyanate,
 (B) a polyether polyol having a number average molecular weight greater than 1500 (preferably 1500 to 3000),
 (C) at least one compound containing 1 to 2 isocyanate-reactive groups and at least one ionic group, said compound preferably being selected from the group consisting of hydroxycarboxylic acids, dihydroxycarboxylic acids, polyhydroxycarboxylic acids, mercaptocarboxylic acids, aminocarboxylic acids, aliphatic diols containing sulfonate groups, diaminosulfonates, and mixtures thereof, and
 (D) a polyamine having a number average molecular weight of at least 32 (preferably 32 to 500),
 wherein the average total functionality of the isocyanate-reactive compounds (B), (C), and (D) is from 1.85 to 2.2 (preferably 1.9 to 2.1) and the molar ratio between the isocyanate groups of component (A) and the isocyanate-reactive groups (i.e., total OH+NH) of components (B), (C), and (D) is greater than 1 (preferably greater than 1.05), thereby forming an intermediate having residual isocyanate groups, and (2) mixing said intermediate with water (which may optionally be mixed with all or a portion of polyamine (D)) to form, as an aqueous dispersion, an anionically modified polyurethane urea having from about 800 to about 1500 mmol (preferably less than 1400 mmol) of urethane groups and from about 800 to about 1800 mmol (preferably 1000 to 1700 mmol) of urethane plus urea groups per kilogram of the anionically modified polyurethane urea.

Within these constraints, the preferred polyurethane ureas have a urea group content of more than 150 mmol (preferably more than 200 mmol) per kilogram of anionically modified polyurethane urea.

DETAILED DESCRIPTION OF THE INVENTION

Polyisocyanate component (A) may be selected, for example, from aromatic diisocyanates of the type described, for example, by W. Siefken in *Justus Liebigs Annalen der Chemie*, 562, pages 75 to 136. The polyurethane component is preferably an isomer of toluene diisocyanate or an isomer of diphenylmethane diisocyanate. Aromatic diisocyanates or diisocyanate mixtures bearing lateral alkyl groups, such as 2,4- and 2,6-toluene diisocyanate, are particularly preferred.

Polyether polyols (B) are preferably selected from the polyaddition products of ethylene oxide, propylene oxide, and butylene oxide and co-polyaddition and graft polyaddition products thereof, the polyethers obtained by condensation of polyhydric alcohols or mixtures thereof, and the polyethers obtained by alkoxylation of water, polyhydric alcohols, amines, or aminoalcohols. Particularly preferred polyether polyols (B) are homo- and/or co-polyaddition compounds of ethylene oxide and/or propylene oxide having a number average molecular weight (based on end-group analysis and functionality) of greater than about 1500 (preferably in the range from 1500 to 3000, more preferably 1800 to 3000) and an average functionality greater than about 1.85 (preferably from 2 to 3). Difunctional polyethers are particularly preferred.

Other relatively high molecular weight polyhydroxyl components known from polyurethane chemistry, for example, those belonging to the classes of polyester, polylactone, or polycarbonate polyols, may optionally be used in small quantities.

Suitable ionic compounds (C) containing 1 to 2 isocyanate-reactive groups and at least one ionic group include compounds such as, for example, hydroxycarboxylic and mercaptocarboxylic acids, amino-carboxylic acids such as glycine, alanine, or 4-aminobutyric acid, di- and polyhydroxycarboxylic acids such as dimethylolpropionic acid, or aliphatic diols containing sulfonate groups according to German Offenlegungsschriften 2,446,440 and 2,437,218. Particularly preferred ionic components (C) include sulfonate diols corresponding to the following formula

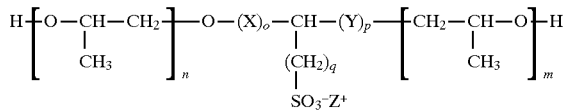

in which
X and Y independently represent difunctional aliphatic hydrocarbon groups containing 1 to 6 carbon atoms,
Z is an alkali metal ion or a proton,
n and m independently represent 0 or numbers from 1 to 30,
o and p have values of 0, 1, 2, or 3, and
q has a value of 0, 1, or 2.
Dimethylolpropionic acid is also particularly preferred.

Other particularly preferred components (C) are diaminosulfonates of the type described in Canadian Patent 928,323, such as the sodium salt of N-(2-aminoethyl)-2-aminoethanesulfonic acid or the sodium salt of N-(2-aminoethyl)-2-aminopropanoic acid, If ionic components (C) are used in the form of non-neutralized carboxylic and/or sulfonic acids, preferred neutralizing agents are tertiary amines, such as triethylamine, tripropylamine, tributylamine, triisopropanolamine, or N,N-dimethylethanolamine, or ammonia; alkali metal hydroxides, such as sodium or potassium hydroxide; or alkali metal carbonates or hydrogen carbonates.

Suitable polyamines (D) are compounds that have a molecular weight (number average molecular weights if based on end-group analysis and functionality of polyamine mixtures) of greater than 32 (preferably in the range from 32 to 500, more preferably 60 to 500) and which contain primary and/or secondary amino groups. Examples of suitable such polyamines include ethylene diamine, hexamethylene diamine, isophorone diamine, 2,4-diaminotoluene, 4,4'-diaminodiphenylmethane, N,N'-dimethyl ethylene diamine, 4,4'-diaminocyclohexylmethane, piperazine, 2,5-dimethylpiperazine, 1,4-diaminocyclohexane, 1,2-diaminopropane, hydrazine or hydrazine hydrate, or triamines such as diethylene triamine.

Monoamines such as, for example, dibutylamine, ethanolamine, N-methylethanolamine, diethanolamine, or propanolamine may optionally be used in small quantities to modify functionality.

The polyamines (D) may, of course, also be used in blocked form, that is, as the corresponding ketimines (German Offenlegungsschrift 2,725,589), ketazines (German Offenlegungsschrift 2,811,148 and U.S. Pat. No. 4,269,748), or amine salts (U.S. Pat. No. 4,292,226).

The polyurethane ureas according to the invention are particularly suitable when they have a content of urethane groups plus urea groups of from 800 to 1800 mmol per kilogram (preferably from 1000 to 1700 mmol per kilogram) of the polyurethane urea.

The polyurethane ureas are generally prepared by one of the following known processes:

(1) The so-called "acetone process" according to German Offenlegungsschrift 1,495,745 and U.S. Pat. No. 3,479,310, in which an NCO-terminated prepolymer is prepared in the melt, dissolved in a suitable solvent, and allowed to react in solution with a chain-extending agent to form a polyurethane. After the solution of the polyurethane has been mixed with water, the polyurethane dispersion is obtained by distilling off the solvent. Essentially linear polyurethanes can be synthesized by this process because crosslinked systems readily gel in the organic phase.

(2) A process for the preparation of polyurethane-based dispersions using blocked amines or hydrazines as chain-extending agent is described in German Offenlegungsschrift 2,725,589 and U.S. Pat. Nos. 4,269,748, 4,192,937, and 4,292,226. In this process, a hydrophilic NCO-terminated prepolymer is mixed with at least partly blocked amines or hydrazines in the absence of water. Water is subsequently added to the resultant mixture so that the previously blocked amine or hydrazine is released and reacts as chain extender for the prepolymer. Although aromatic diisocyanates may also be used in this process to form the NCO-terminated prepolymers, prepolymers containing aliphatically and/or cycloaliphatically bound NCO groups are preferred.

(3) In another known process, the NCO-terminated prepolymers are chain-extended in aqueous medium by dispersion of the hydrophilic prepolymers in water and subsequent addition of the chain extending agent. The dispersion may be formed both by adding water to the prepolymer and by adding the prepolymer to water. When chain extension is carried out in aqueous medium, prepolymers terminated by aliphatic and/or cycloaliphatic NCO groups are particularly preferred. When aromatically bound terminal NCO groups are used, these isocyanate groups are preferably capped before the addition of water, as described in U.S. Pat. No. 4,387,181.

Acetone process (1) is generally preferred for the preparation of dispersions according to the invention.

Suitable organic solvents for the polyurethane ureas according to the invention are, for example, dimethyl formamide, dimethyl acetamide, tetrahydrofuran, or N-methyl pyrrolidine or solvent mixtures of ketones such as, for example, cyclohexanone, methyl ethyl ketone, methyl isobutyl ketone, or acetone, and alcohols such as, for example, isopropyl alcohol, butanol, tert-butyl alcohol, methoxypropanol, or butyl glycol.

According to a preferred embodiment, the polyurethane ureas used according to the invention have a Shore A hardness of at most about 50.

The polyurethanes used according to the invention may be dispersed by basically any process, including, for example, dispersion without solvents, for example, by mixing the polyurethane melts with water in units capable of producing a high shear rate; the use of very small quantities of solvent for plasticizing during processing in such units; and the use of non-mechanical dispersion means, such as sound waves of extremely high frequency. However, simple mixers, such as stirred tanks or so-called reflux mixers, may also be used when the polyurethanes are self-dispersible.

In general, the quantities of starting components (A) to (E) are selected in such a way that anionically modified polyurethane ureas containing 5 to 35 mmol (preferably 10 to 30 mmol) of anionic groups per 100 g of polyurethane urea and dispersions having a solids content of 20 to 60% by weight are obtained.

The functionalities of components (B) to (D) are selected in such a way that the specified average total functionality is obtained.

Regardless of the method used, water is substantially absent during the reaction of diisocyanate (A) with the isocyanate-reactive alcoholic compounds of component (B) and any hydroxyl-containing compounds that might be used in component (C). When finally added, the water reacts with the residual isocyanate groups left from the reaction of excess diisocyanate (A) with isocyanate-reactive compounds (B), (C), and (D), thereby forming additional amino groups that react rapidly with the remaining isocyanate groups to produce further chain extension.

The polyurethane ureas used according to the present invention are distinguishable from those of European Patent Application 441,196 (believed to correspond to Canadian Patent 2,035,355). For example, the ratio between the isocyanate groups and the isocyanate-reactive alcoholic and anionic groups in the examples of European Patent Application 441,196 is 1.0. Because the water required for dispersion of the polymers must be added before all of the alcoholic hydroxyl groups have completely reacted with the isocyanate groups, water also takes part in the reaction as an isocyanate-reactive component. The actual ratio between the isocyanate and isocyanate-reactive groups is thus always smaller than 1. Consequently, some of the alcoholic groups remain unreacted. In other words, each molecule of water that takes part in the reaction indirectly causes chain termination. As a result, a relatively low molecular weight product having terminal hydroxyl groups is obtained.

In contrast to the compositions disclosed in European Patent Application 441,196, the polyurethane ureas used in the present invention are prepared using a ratio between isocyanate groups and isocyanate-reactive alcoholic and amine groups that is greater than 1. Because water is added at a stage at which all of the available alcoholic hydroxyl groups have already reacted with isocyanate groups, water does not compete in the reaction between isocyanate and hydroxyl groups. The polyamines, even when added with water after initial reaction of the other isocyanate-reactive components, react so rapidly that water also does not compete with the reaction between isocyanate and amine groups. As a result, the water can react only with residual isocyanate groups of the initially formed product and thus plays an essential role in increasing the molecular weight of the product.

The anionically modified polyurethane ureas of the present invention are imminently suitable for use as adhesion promoters in the finishing of leather.

The following examples further illustrate details for the preparation and use of the compounds of this invention. The invention, which is set forth in the foregoing disclosure, is not to be limited either in spirit or scope by these examples. Those skilled in the art will readily understand that known variations of the conditions and processes of the following preparative procedures can be used to prepare these compounds. Unless otherwise noted, all temperatures are degrees Celsius and all parts and percentages are parts by weight and percentages by weight, respectively.

EXAMPLES

Determination of Solubility and Viscosity in THF 10 parts of each test aqueous dispersion containing 30% solids are diluted with 90 parts of tetrahydrofuran (THF) at 25° C. with stirring for 60 minutes.

Solubility evaluation: Complete solubility exists when a clear flowable solution without any gel content visible with the naked eye is obtained.

Viscosity: The reported viscosities represent outflow viscosities determined according to DIN (German Industrial Standard) 53 211 from a DIN beaker having a 4 mm nozzle. The numerical values refer to the outflow time in seconds (sec) up to the point in time at which the thread of liquid breaks.

Determination of Shore A Hardness Based on DIN 53 505

10 ml of a 30% aqueous polyurethane urea dispersion are poured onto glass, left to dry overnight at room temperature, and subsequently heated to 50° C. for one half hour. The film is peeled off the glass and cut into strips. The strips are placed one above the other so that no air is enclosed and the stack is at least 6 mm high. The stack is then tested. The mean value of three measurements is reported.

Example 1

400 g of a polypropylene oxide diol (OH number 56) and 18.8 g of dimethylolpropionic acid were freed from water for 60 minutes at 110° C. and 15 mbar. 73.9 g of a 35:65 mixture of 2,6- and 2,4-toluene diisocyanate were added at 95° C. An isocyanate content of 1.34% was reached after 5 hours. The reaction mixture was diluted with 390 g of acetone, and 10.6 g of triethylamine were added over a period of 15 minutes at 50° C. The solution was diluted with 1000 g water and chain-extended with 2.7 g of diethylene triamine in 100 g of water. After removal of the acetone by distillation, a fine-particle dispersion having the following characteristics was obtained:

| | |
|---|---|
| Solids content: | 30.6% by weight |
| pH: | 8.0 |
| Urethane groups: | 1344 mmol/kg |

| | |
|---|---|
| Urea groups: | 255 mmol/kg |
| Urethane + urea groups: | 1599 mmol/kg |
| Shore A hardness: | 47 |
| Solubility in THF: | completely soluble (clear solution) |
| Viscosity in THF: | 26 (sec) |

Example 2

The procedure is the same as in Example 1, except that 12.1 g of isophorone diamine were used instead of 2.7 g of diethylene triamine:

| | |
|---|---|
| Solids content: | 30.7% by weight |
| pH: | 8.2 |
| Urethane groups: | 1319 mmol/kg |
| Urea groups: | 303 mmol/kg |
| Urethane + urea groups: | 1622 mmol/kg |
| Shore A hardness: | 44 |
| Solubility in THF: | completely soluble (clear solution) |
| Viscosity in THF: | 22 (sec) |

Example 3

1380 g of a polypropylene oxide diol (OH number 56) and 65 g of dimethylolpropionic acid were freed from water for 60 minutes at 110° C. and 15 mbar. 266 g of a 35:65 mixture of 2,6- and 2,4-toluene diisocyanate were added at 90° C. An isocyanate content of 1.55% was reached after 5 hours. The reaction mixture was diluted with 3300 g of acetone. 12.25 g of ethylene diamine in 160 g of water were added to the acetone solution at 55 to 65° C. The solution was then neutralized with 35 g of triethylamine and dispersed with 4000 g of water. After removal of the acetone by distillation, a fine-particle dispersion having the following data was obtained:

| | |
|---|---|
| Solids content: | 30.5% by weight |
| pH: | 7.7 |
| Urethane groups: | 1335 mmol/kg |
| Urea groups: | 332 mmol/kg |
| Urethane + urea groups: | 1667 mmol/kg |
| Shore A hardness: | 49 |
| Solubility in THF: | completely soluble (clear solution) |
| Viscosity in THF: | 17 (sec) |

Examples 4 to 5

Preparation of the Test Specimens

11×20 cm samples were cut from a full grain leather phobicized with a commercially available fluorocarbon resin. Aqueous preparations having a solids content of 6% and an isopropyl alcohol content of 10% were prepared from the products described in Examples 2 and 3. 5 g of these preparations were sprayed onto the grain side of the leather samples. After drying (10 minutes at 50° C.) and storing overnight at room temperature, the leathers thus treated were oversprayed twice with 5 g of a mixture of 75 parts of EUDERM® Grundschwarz C, 75 parts of EUDERM® Filler VF, 50 parts of EUDERM® Paste OF, 150 parts of EUDERM® Dispersion 32 A, 150 parts of BAYDERM® Grund 50 UD, and 500 parts of water. The dried samples were tested for dry and wet adhesion in accordance with JUF 470 (DESMOCOLL method), with results (in N-cm$^{-1}$) given in the following Table.

TABLE

| | | Adhesion (N/cm) | |
|---|---|---|---|
| Example | Dispersion | Dry | Wet |
| 4 | Example 2 | 6.0/6.2* | 2.8/2.8 |
| 5 | Example 3 | 7.5/7.0* | 3.0/3.5 |

*Grain tears

Example 6

(Comparison with U.S. Pat. No. 4,895,894)

A mixture of 200 g of a polypropylene oxide diol (OH number 56) and 13.6 g of dimethylolpropionic acid was dehydrated for 60 minutes at 110° C. and 15 mbar. 80 g of 4,4'-methylenebis(cyclohexyl isocyanate) were added at 100° C. An isocyanate content of 2.72% was obtained after 4 hours. The melt was stirred with 9.8 g of triethylamine at 70° C. for 15 minutes, after which the mixture was diluted with 700 g of water. 5.41 g of ethylene diamine in 100 g of water were added to the solution. A finely divided dispersion that solidified to a curd-like form after about 3 hours was obtained.

| | |
|---|---|
| Urethane groups: | 1308 mmol/kg |
| Urea groups: | 625 mmol/kg |
| Urethane + urea groups: | 1933 mmol/kg |
| Solubility in THF: | insoluble |

What is claimed is:

1. A method for finishing leather comprising coating leather with an anionic polyurethane urea prepared by
   (1) reacting
      (A) an aromatic diisocyanate with an isocyanate-reactive component consisting essentially of
      (B) a polyether polyol having an isocyanate-reactive functionality of 2 and a number average molecular weight greater than 1500,
      (C) (i) a compound containing one isocyanate-reactive group and at least one anionic group, (ii) a compound containing two isocyanate-reactive groups and at least one anionic group selected from dimethylol-propionic acid and anionic forms thereof, or (iii) mixtures thereof, and
      (D) a polyamine having a number average molecular weight of at least 32,
      wherein the average total isocyanate-reactive functionality of the isocyanate-reactive compounds (B), (C), and (D) is from 1.85 to 2.2 and the molar ratio between the isocyanate groups of component (A) and the isocyanate-reactive groups of components (B), (C), and (D) is greater than 1, thereby forming an intermediate having residual isocyanate groups, and
   (2) mixing said intermediate with water (optionally mixed with all or a portion of polyamine (D)) to form, as an aqueous dispersion, an anionic polyurethane urea having from 800 to 1500 mmol of urethane groups and from about 800 to about 1800 mmol of urethane plus urea groups per kilogram of the anionic polyurethane urea.

2. A method according to claim 1 wherein polyether polyol (B) has a number average molecular weight of 1500 to 3000.

3. A method according to claim 1 wherein polyamine (D) has a number average molecular weight of 32 to 500.

4. A method according to claim 1 wherein the average total isocyanate-reactive functionality of the isocyanate-reactive compounds (B), (C), and (D) is 1.9 to 2.1.

5. A method according to claim 1 wherein the molar ratio between the isocyanate groups of component (A) and the isocyanate-reactive groups of components (B), (C), and (D) is greater than 1.05.

6. A method according to claim 1 wherein all of polyamine (D) is mixed with water in step (2).

7. A method according to claim 1 wherein the anionic polyurethane urea has a content of urethane groups plus urea groups of 1000 to 1700 mmol per kilogram of the anionic polyurethane urea.

8. A method according to claim 1 wherein the anionic polyurethane urea contains 5 to 35 mmol of anionic groups per 100 g of polyurethane urea.

9. A method according to claim 1 wherein the aqueous dispersion has a solids content of 20 to 60% by weight.

10. A method according to claim 1 wherein polyether polyol (B) is (i) a polyaddition product of ethylene oxide, propylene oxide, and butylene oxide, or a co-polyaddition or graft polyaddition product thereof; (ii) a polyether obtained by condensation of a dihydric alcohol or a mixture thereof; (iii) or a polyether obtained by alkoxylation of water, a dihydric alcohol, an amine, or an aminoalcohol.

11. A method according to claim 1 wherein compound (C) is dimethylolpropionic acid or an anionic form thereof.

* * * * *